Jan. 26, 1965 H. J. SCHULZ ETAL 3,167,631
METHOD OF AND APPARATUS FOR ELECTRO-EROSION GRINDING
Filed Sept. 5, 1961
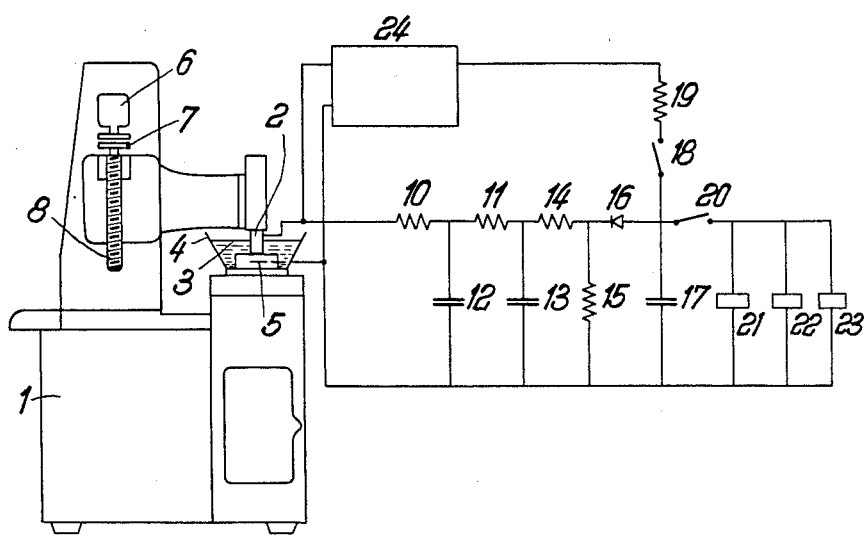
Inventors
Hans J. Schulz
Hans Schierholt
Edmund Lang
By Cushman, Darby & Cushman
Attorneys

3,167,631
METHOD OF AND APPARATUS FOR ELECTRO-EROSION GRINDING

Hans J. Schulz, Wuppertal-Vohwinkel, Hans Schierhol, Aachen, and Edmund Lang, Babenhausen, Hessen, Germany, assignors to Deutsche Edelstahlwerke Aktiengesellschaft, Krefeld, and Allgemeine Elektricitats-Gesellschaft, Berlin-Grunewald, Germany
Filed Sept. 5, 1961, Ser. No. 135,840
Claims priority, application Germany, Sept. 10, 1960, D 34,232
4 Claims. (Cl. 219—69)

The invention relates to a method of grinding metal workpieces by electro-erosion, more particularly spark erosion, and also to a preferred apparatus for carrying out or controlling such method.

As is well known, in spark erosion grinding a rotating discoid metal electrode is used between which and the workpiece a spark gap is maintained. The electrode and the workpiece are connected to a special spark generator. It has already been proposed to maintain the gap between the discoid electrode and the workpiece by means of the hydrodynamic boundary layer which is present when there is slight contact pressure between the electrode and the workpiece. Advantageously, in this known procedure the wetting liquid is introduced into the gap between the electrode and the workpiece and a constantly renewed accumulation of gases is produced in the boundary layer in the gap to help produce a large number of sparks. Apart from the fact that the friction of the rotating electrode on the workpiece due to rotation of the disc leads to the liquid being supplied continuously into the gap between the electrode and the workpiece, the continuous motion of the electrode prevents high temperature increases of the cutting edge at the cutting zone, and arcing is also reduced very considerably. Rotating electrodes of discoid cross-section and electrodes in strip and wire form have been used for this kind of grinding.

A particular disadvantage of the kown apparatus in which grinding is performed without control of the gap between the electrode and the workpiece is that it is left to the operator to adjust the electrode disc, with the result that the grinding electrode may be pressed against the workpiece with such a pressure that the hydrodynamic boundary layer ceases to be maintained. If such high-pressure engagement occurs, there is a risk that the components of the apparatus may be damaged and that a continuous current may flow between the electrode and the workpiece and lead to unwanted heating.

In conventional spark erosion methods using a stationary electrode it is known for electrode feed movement to be controlled in dependence upon electrical magnitudes in the gap, for instance, the voltage across the gap, through the agency of amplifying and control and regulating elements. Where, however, a high disc speed is employed and therefore a corresponding rate of flow is necessary to maintain the hydrodynamic boundary layer, no such control can be provided. The known regulating elements, such as motors or switching relays and so on, are not sufficiently responsive where a high-speed electrode disc is so employed.

The invention aims at the automatic adjustment of the disc and according to the invention, using the possibility of maintaining the gap by maintaining the gap by means of the hydrodynamic boundary layer, after each grinding pass the state of the previous grinding pass is checked by an integrating measurement of an electrical magnitude derived from the working gap (and which may be an electrical magnitude at the gap or one dependent thereupon), and, according to the state of erosion, either an adjustment is effected for the next pass automatically or the gap of the last pass is maintained. Consequently, in contrast to known feeding methods, the disc is not advanced as is the stationary electrode in dependence upon the immediate conditions prevailing in the gap; instead, an electrical quantity is integrated over the whole surface and the feed of the disc is controlled in dependence upon the product of this integrated measurement.

Very conveniently, an integrating measurement of the spark voltage occurs during a pass of the electrode disc and, in dependence upon the result of the operation, the disc is adjusted on the basis of a comparison with a predetermined desired value or the gap is maintained constant.

Alternatively, an integrating measurement of the spark sequence of frequency—i.e., the number of sparks—can be made during a pass, and the mean value of this spark number compared with a desired value and the adjustment of the disc accordingly corrected. Further through the integrating measurement, the minimum values of the spark voltage and/or the maximum values of the spark sequence may be found during a pass and compared with a desired value, and the amount of adjustment determined according to the amount by which the spark voltage exceeds the desired value and/or the amount by which the spark sequence falls short of the desired value.

It is advantageous, in order to facilitate adjustment at the start of grinding and to obviate errors by the operator, for the adjustment of the grinding spindle support to be such that in the event of a short circuit such support is immediately raised by a desired amount. With relaxation oscillators the integrating measurement can be based on the discharge current as a measure of the spark sequence, which current can be similarly found in integrated fashion and used for correction purposes.

The drawing diagrammatically illustrates an advantageous apparatus and circuit diagram for carrying the method according to the invention into effect.

A conventional surface grinder 1 comprises in manner known an A.C. motor 6 and a clutch 7 for advancing a grinding disc electrode 2 towards a workpiece 5 below the level of a working liquid 3 in a tank 4. The clutch 7 is temporarily engaged to connect the A.C. motor to a feed spindle 8 of a grinding spindle support 9 for a few revolutions, to advance to disc 2, for instance, by 0.002 mm. The engagement of the motor 6 through the clutch 7 is effected by means of a system in which high-frequency components are removed from the spark voltage by a smoothing network comprising resistors 10, 11 and condensers and shunted across a spark gap supplied by a generator 24. The mean spark voltage is applied through a decoupling resistor 14 to a measurement resistor 15 which has one end connected through a diode 16 to a storage condenser 17. At the beginning of the pass the condenser 17 is charged up to the maximum no-load voltage through a switch 18, which is closed for a brief period, and through a resistance 19, which is connected to a voltage source of the spark generator 24. During the pass the voltage across the condenser 17 drops, because of the diode 16 becoming operative, to the lowest spark voltage amplitude which is operative across the resistor 15.

At the termination of the pass the switch 20 is closed briefly for the condenser 17 to discharge through three parallel relays 21–23 of graduated sensitivity. The number of relays which pick up depends upon the magnitude of the charge of the condenser 17, and a corresponding advance is provided of the grinding spindle support. If the charge across the condenser 17 at the end of a pass is insufficient to operate any of the three relays 21–23, the grinding spindle support is not advanced—i.e., during the next pass grinding is performed with the grinding spindle support 9 at the same setting as during the previous pass. This state of affairs continues until the charge across the condenser 17 is sufficient to operate one or more of the relays 21–23. The sensitivity of the most sensitive relay corresponds to the preset desired value.

The subject matter of the invention is not limited to this particular embodiment, and the minimum voltage can readily be compared with a desired value by means of other circuit means.

What we claim is:

1. A method of electro-erosively traverse grinding by means of a rotating electrode forming with the work piece a sparking-gap which comprises storing a representative of the minimum working gap between electrode and work in each traverse in the form of a characteristic electrical quantity and controlling the in-feed of the electrode before the next traverse to adjust the said gap for the next traverse or to maintain the existing gap in accordance with the magnitude of the said quantity.

2. The method claimed in claim 1, which comprises before each grinding traverse briefly switching a storage condenser into connection with a spark generator and thereby charging the condenser to the maximum no-load voltage, said storage condenser being connected across the grinding gap, and during the grinding traverse being discharged to an extent according to the lowest sparking voltage in grinding, and finally at the end of the grinding traverse, switching the storage condenser into connection with a number of relays of graduated sensitivities of response and thereby controlling the distance of in-feed by reference to the residual charge remaining in the storage condenser.

3. In apparatus for electro-erosively grinding surfaces and comprising a rotating electrode; means for establishing a characteristic electrical quantity in each traverse of electrode to work and utilizing this to control the gap, said means comprising a spark generator, a storage condenser, switching means operative for temporarily connecting the condenser to the maximum no-load voltage, a diode, said condenser being arranged for permanent connection across the spark gap via said diode, a decoupling resistor and a ripple filter connectable by said switching means to the spark generator, a resistor between the said spark generator and the said ripple filter, and a number of relays of graduated sensitiveness of response which determine the distance of in-feed by reference to the residual charge remaining in the storage condenser; and swtiching means for connecting the said condenser, resistors and ripple filter to the said relays at the end of the grinding traverse.

4. A method of electro-erosively traverse grinding a workpiece by means of a rotating electrode forming with the workpiece a sparking gap, comprising continuously monitoring an electrical quantity that varies with and characterises the transient width of the spark gap between work and tool and for maintaining a spark gap of constant width controlling the necessary in-feed at the end of each pass by reference to that value of said electrical quantity which represents the minimum gap width that had occurred during the pass.

References Cited by the Examiner

UNITED STATES PATENTS

| | | | |
|---|---|---|---|
| 2,807,706 | 9/57 | Oezer | 219—69 |
| 2,818,491 | 12/57 | Matulaitis | 219—69 |
| 2,980,787 | 4/61 | Bruma | 219—69 |

RICHARD M. WOOD, *Primary Examiner.*